US008619111B2

(12) United States Patent
Roach, Jr.

(10) Patent No.: US 8,619,111 B2
(45) Date of Patent: Dec. 31, 2013

(54) METHODS AND APPARATUSES FOR USING A MOBILE DEVICE TO PROVIDE REMOTE ASSISTANCE

(75) Inventor: Peter Roach, Jr., Jacksonville, FL (US)

(73) Assignee: Georgia Tech Research Corporation, Atlanta, GA (US)

( * ) Notice: Subject to any disclaimer, the term of this patent is extended or adjusted under 35 U.S.C. 154(b) by 781 days.

(21) Appl. No.: 12/729,020

(22) Filed: Mar. 22, 2010

(65) Prior Publication Data

US 2010/0238194 A1 Sep. 23, 2010

Related U.S. Application Data

(60) Provisional application No. 61/210,600, filed on Mar. 20, 2009.

(51) Int. Cl.
H04N 7/14 (2006.01)
(52) U.S. Cl.
CPC ...................................... H04N 7/14 (2013.01)
USPC .................. 348/14.01; 348/14.12; 348/14.02; 345/629
(58) Field of Classification Search
USPC ............ 455/3.01, 92, 352, 403, 404.1, 414.1, 455/420; 348/14.01–14.16; 709/204, 227; 345/629, 8
See application file for complete search history.

(56) References Cited

U.S. PATENT DOCUMENTS

| 7,982,763 | B2* | 7/2011 | King .......................... 348/14.08 |
| 2002/0074370 | A1* | 6/2002 | Quintana et al. .............. 224/262 |
| 2003/0104806 | A1* | 6/2003 | Ruef et al. .................... 455/422 |
| 2008/0298571 | A1* | 12/2008 | Kurtz et al. ................... 379/156 |
| 2009/0033736 | A1* | 2/2009 | Thomason ................ 348/14.02 |
| 2009/0164899 | A1* | 6/2009 | Hernacki et al. ............. 715/709 |

FOREIGN PATENT DOCUMENTS

WO    WO 2004064410 A1 *  7/2004

* cited by examiner

Primary Examiner — Melur Ramakrishnaiah
(74) Attorney, Agent, or Firm — Christopher W. Glass, Esq.; Ryan A. Schneider, Esq.; Troutman Sanders LLP

(57) ABSTRACT

Systems and methods for providing remote assistance to a user are disclosed. A remote assistance system may communicate with a mobile device operated by the user and may manipulate devices configured on the mobile device, such as a camera, an illumination device, a projection device, or any other types of devices. Images may be captured with a camera of the mobile phone and transmitted by the mobile phone to the remote assistance system. A remote assistant may transmit images or other visual data to the mobile phone that are then overlaid upon images presented on the mobile phone. Various image manipulation and stabilization means and methods are disclosed, as well as various ways of obtaining and providing remote assistance.

26 Claims, 10 Drawing Sheets

METHODS AND APPARATUSES FOR USING A MOBILE DEVICE TO PROVIDE REMOTE ASSISTANCE

CROSS-REFERENCE TO RELATED APPLICATIONS

This application claims the benefit of U.S. Provisional Patent Application No. 61/210,600, filed on Mar. 20, 2009, entitled "Methods and Apparatuses for a Mobile Phone with a Controllable Pointing Device", which is hereby incorporated by reference.

TECHNICAL FIELD

The present invention relates generally to portable or mobile devices and systems and, more particularly, to systems, devices, and methods for providing assistance remotely using a portable or mobile device.

BACKGROUND

Often it is desirable to provide assistance remotely to an individual or group or to provide some type of instruction to a remotely located individual or group. Currently this is possible through the activation of a camera on a mobile phone or other portable device operated by the individual or one of the group. Images captured by the camera of a mobile phone or other device can be transmitted to an assistant, allowing the assistant to remotely view the surroundings of an individual or group or objects therein. However, with current technology, remote assistance is limited and often entails only providing verbal instruction or assistance via the voice communication means of a mobile telephone or other portable device. There is no currently available means for a remote assistant to easily provide diagrams, marked up pictures, or other visual data via the screen of the mobile phone in real-time or near real-time.

Therefore, what is needed are methods, systems, and apparatuses that allow a remote assistant to offer assistance by interacting directly with the environment of the individual or the group requesting assistance. This interaction should also be controllable by the remote assistant. It would be further beneficial if the remote assistant was able to obtain a real-time or near real-time view or status of the device operated by the individual/group requesting assistance and their surroundings and objects therein and for the remote assistant to be capable of providing graphical markups or to share images in order to facilitate the assistance session.

SUMMARY

Systems and methods for providing remote assistance to a user are provided herein. A user who may need assistance with a task or activity may request assistance from a remote assistance system or provider. The remote assistance system may communicate with a mobile device operated by the user. The mobile device may be configured with a camera, an illumination device, a projection device, or any other types of devices. Images may be captured with a camera of the mobile phone and transmitted by the mobile phone to the remote assistance system. The remote assistance system may then use such image to provide assistance to the user. The remote assistance system may also control or manipulate devices configured on the mobile device, for example, focusing or zooming in and out on a camera, providing, increasing, or decreasing the amount of illumination provided by an illumination device, or instructing a projection device to project images onto an area proximate to the user's mobile phone.

Various means and methods may be used to improve the remote assistance experience. A remote assistant may transmit images or other visual data to a mobile phone of a user requesting assistance that are then overlaid upon images presented on the mobile phone, providing the user with direction and specific data regarding the task undertaken. Image stabilization means and methods may be used to provide a stable image to the user and/or the remote assistant. Various way of obtaining and providing remote assistance may be used, including auction-type methods for obtaining a remote assistant, and using multiple remote assistant that may be coordinated by a single assistant or device. These and other aspects of the present subject matter are described in the Detailed Description below and the accompanying figures.

BRIEF DESCRIPTION OF THE DRAWINGS

The following Detailed Description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
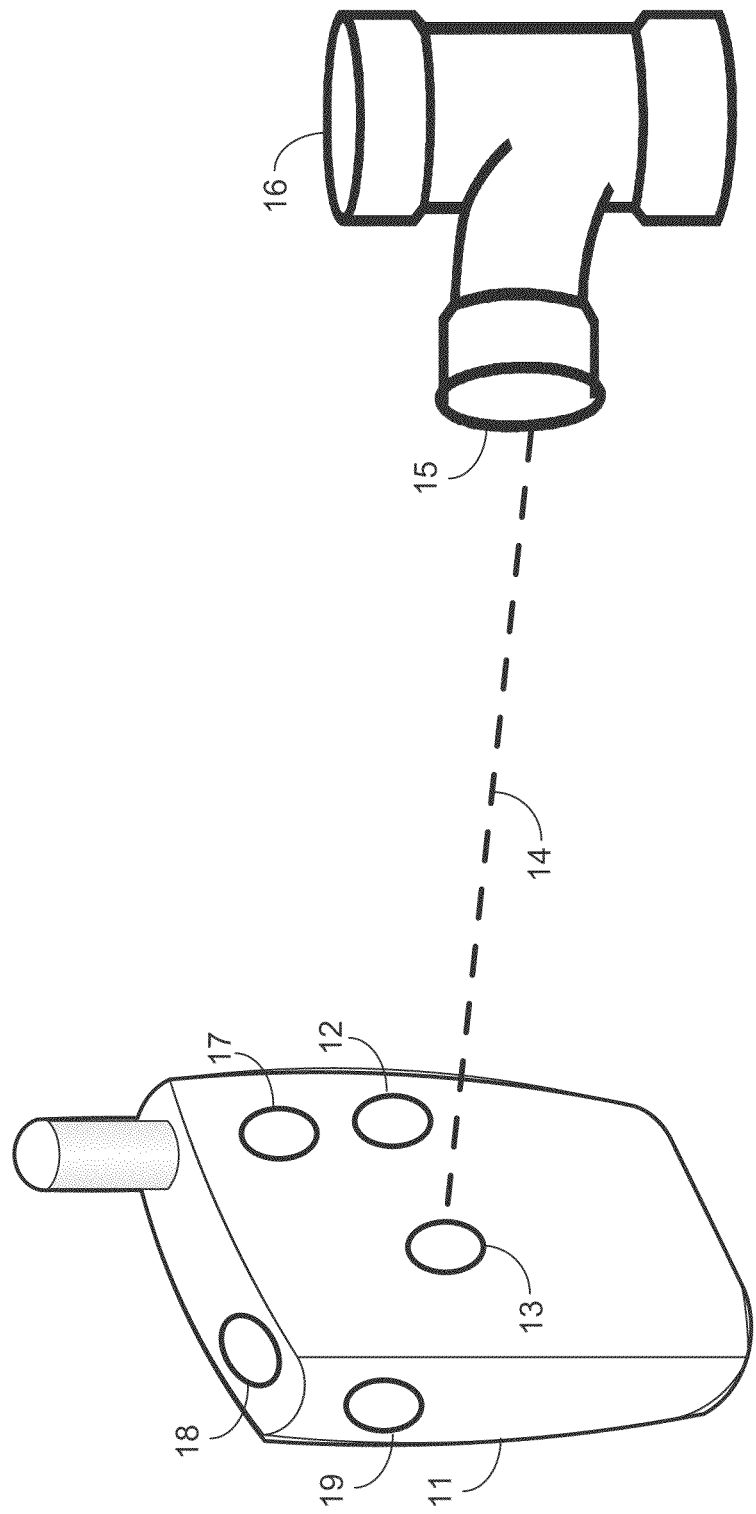
FIG. 1 illustrates a non-limiting exemplary mobile phone and associated devices in an environment in which remote assistance may be performed.

Explanation of Terms—The explanations of terms listed below are not intended to limit the terms used in this disclosure in any manner. This section is included in this document because those skilled in the art, when using this disclosure, will recognize how the following terms can be expanded to include the additional material described or how the term used can be expanded to include the thoughts contained in each listing:

"Real-time" may be interpreted to include near real-time.

"Mobile phone" and "mobile device" as used interchangeably herein should be interpreted to mean any device communicatively connected to a wireless data and/or voice network that is capable of communicating with such a network using any protocol or communication means. Examples can be a wirelessly connected tablet or laptop computer (for example, the iPad™, Panasonic Toughbook H1 Field™, or any other tablet or laptop computer), a wirelessly connected smart phone (for example, the iPhone™, Blackberry™, the Google™ Nexus One™); cellular telephones or other wireless communications devices configured with an operating system (including those that may be intended for use on such devices, such as Android™, Windows™ mobile, Symbian™, or any other operating system), or any other type of mobile communications device. Alternatively, a mobile phone as described herein may be a smart camera capable of communicating with a data network and may be configured with an operating system as described above.

"Mobile phone" and "mobile device" as used interchangeably herein also include any device having the capabilities of a mobile telephone, including having a transceiver configured to transmit and received voice and/or data signals. "Mobile phone" as used herein is also a device configured with a camera or similar image capture device capable of capturing still or video images. The mobile phone may also contain one or more lighting sources for illuminating the area covered by the wireless camera. A camera configured on a device as described herein may be integrated into the housing of such a device, or may alternatively be physically separate from such a device and communicatively connected to the device via a wired or wireless communication medium. Mobile phones as described herein may also be configured to transmit still and/or video images over a data network. A mobile phone may also be configured with an image display device or visual display device such as a liquid crystal display (LCD) or similar display device.

"Camera" as used herein includes any device capable of capturing one or more still or video images. Other devices may be integrated with or communicatively connected to a camera, such as a camera integrated with a headset for providing audible signals, such as a Bluetooth™ headset or other Bluetooth™-enabled peripheral device or any other device configured to operate on a personal area network or communicate with other devices, such as a mobile phone, using any means. A "smart" camera may also be configured to capture audio data through the use of an integrated or physically separate microphone or similar device.

"Pointing device" and "projection device" as used interchangeably herein includes any pointing device, image projection device, or any other device capable of projecting light, images, pictures, video, or any other visual information or indicator. "Pointing device" also includes any device capable of illuminating at least a portion of the viewable area by the camera using any effective means. Examples of a pointing device include an LCD projector, a laser based projector, and a laser pointing device, but any other means of providing the functions of a pointing device are contemplated as within the scope of the present disclosure. A pointing device may be integrated with or communicatively connected to a camera, such as a Bluetooth™ headset or other Bluetooth™-enabled peripheral device or any other device configured to operate on a personal area network or communicate with other devices using any means.

"Computer" and "computing device" as used interchangeably herein includes any device or combination of devices configured with at least one processor capable of executing computer-readable and/or computer-executable instructions. Such devices include laptop computers, desktop computers, servers, mainframes, mobile phones as described above, personal data assistants (PDAs), and any other device configured with a processor. While such devices are also typically configured with memory and storage devices, memory and storage devices are not required for a computer as used herein.

"Software" as used herein includes any set of computer-readable and/or computer-executable instructions. Software as used herein may be located on a mobile phone, a server located on a network, on a remote assistance system, or on any other device or medium capable of being accessed by a computer. Software as used herein may be located on a device separate from the device executing the software, and may be accessed remotely over a network or via any other data communications means.

"Remote assistance system" and "remote assistance terminal" as used interchangeably herein, while typically shown in the diagrams as a single physical piece of hardware, may alternatively be software capable of being run on hardware such as a personal computer, smart phone, tables PC, server in the network, or other similar hardware platforms or combination of platforms without deviating from the intent of this disclosure.

Referring now to FIG. 1, the present disclosure provides methods and apparatuses for combining remotely controllable pointing device 13 into mobile phone 11. Mobile phone 11 may be configured with camera 12. Mobile phone 11 may also be configured with projection device 13 that, in one embodiment, may be a micro projector or a laser. Projection device 13 may be capable of being controlled, locally and/or remotely, in the x and y plane to project an image or illuminate an area, such as area 15 of object 16 that is currently in the view of mobile phone 11.

In one embodiment, projection device 13 may be oriented in the same direction as camera 12 on mobile phone 11. This may be accomplished by orienting the two devices so that there is at least some overlap between the image capture area of camera 12 and the projection coverage area of projection device 13. In one embodiment, camera 12 and projection device 13 may be permanently affixed on the same side or the same face of mobile phone 11 as seen in FIG. 1. In other embodiments, a projection device may be configured to rotate in a manner such that the projection device can be oriented in multiple different directions, including in a direction where the projection area of the projection device overlaps, at least in part, with the image capture area of camera 12 configured on mobile phone 11. For example, mobile phone 11 may be configured with projection device 18 instead of, or in addition to, projection device 13. Projection device 18 may be affixed to mobile phone 11 such that it can be alternatively oriented to project images, light, etc. in the direction of the top of mobile phone 11 or in the direction of the back of mobile phone 11. Such an embodiment would allow a user to place mobile phone 11 on a flat table when used as a projector or alternatively to orient projection device 18 in the same direction as camera 12 in order to overlap the viewing area of with the image projection area of projection device 18. One skilled in the art, when utilizing this disclosure, will recognize that a movable projection device can alternatively be alternatively orientated; e.g., back of mobile phone and side of mobile phone, without deviating from the intent of this disclosure.

In yet other embodiments, camera 12 may be oriented or located at the top of mobile phone 11 and controllable in a similar manner as projection device 18 or any other camera or projection device as described herein. One skilled in the art, using this disclosure, will recognize that the either camera 12, projection device 18, and/or projection device 13 may be oriented, moved, or otherwise manipulated so that at least portions of the image capture area of a camera and the image projection area of a projection device overlap. Moreover, while camera 12 and projection device 13 are oriented generally on the back of mobile phone 11, facing outward (i.e., located on the face of mobile phone 11 opposite the location where an image display unit, such as an LCD display, may typically be configured), one skilled in the art will recognize how the intended functionality of the present subject matter can be achieved by mounting camera 12, projection device 13, or any other cameras and projection devices on other faces or planes of mobile phone 11 without deviating from the intent of this disclosure. Any location, orientation, and/or manipulation of such devices is contemplated as within the scope of the present disclosure. Moreover, any number of cameras, projection devices, and any other peripheral and/or integrated devices may communicatively and/or physically connected to mobile phone 11 and all such embodiments are also contemplated.

In one embodiment, illumination device 17 may be configured on mobile phone 11. Illumination device 17 may be a separate device from projection device 13 or 18 and camera 12, or may be integrated into such devices. Illumination device 17 may be a typical illumination device commonly used with cameras that produces a broad spectrum of visible light waves, a laser generating device that generates a laser that is visible to the unaided human eye, an infrared light generating device that generates infrared light (typically a wavelength between 0.7 and 300 micrometers, which equates to a frequency range between approximately 1 and 430 THz), or an ultraviolet light generating device that generates ultraviolet light (electromagnetic radiation with a wavelength shorter than that of visible light, but longer than x-rays, in the range 10 nm to 400 nm, and energies from 3 eV to 124 eV). In embodiment where illumination device 17 generates light that is typically not visible to the human eye, a filter, software, or other means may be used to manipulate an image captured by camera 12 such that the details of the image captured in light that is not visible to the human eye are viewable on a display by a human user.

In other embodiments, illumination device 17 may generate an "eye safe laser" for the pointing device. Such a laser may have emission wavelengths longer than 1.4 μm. Light in that wavelength range is strongly absorbed in the eye's cornea and lens and therefore cannot reach the significantly more sensitive retina, thus making such light typically much safer for use by humans than standard laser light. Any other "eye safe laser" may be generated by illumination device 17 to help to ensure the inadvertent directing of the pointing device into a user's eye does not cause undue damage. Note that illumination device 17 may be located on area section of mobile phone 11, may be oriented in any direction, and may be manipulated in any manner or means, including those described in regard to camera 12 and projection devices 13 and 18. Note also that there may be any number of illumination devices of any type and combination configured on mobile phone 11. All such embodiments are contemplated as within the scope of the present disclosure.

Note that in some embodiments, projection devices 13 and 18 may use similar means to those described herein in regard to illumination device 17. For example, projection devices 13 and 18 may be constructed with a light emitting diode (LED) based projector capable of transmitting an image. Such and LED projector may generate infrared, visible, or ultraviolet light to illuminate an area, as well as, or instead of, visible light. In some embodiments, projection device 13 or 18 may perform the functions of illumination device 17. For example, software that operates projection device 13 or 18 may be configured to allow projection device 13 or 18 to project a white background, or similar light enhancing background, across at least part of the image capture area of camera 12. This would allow projection device 13 or 18 to serve a dual purpose of being a projector and additionally providing illumination for camera 12. In this example, projection device 13 or 18 can be used to augment or replace a flash device on mobile phone 11 or to add light the image capture area of camera 12 to enhance the uses of camera 12.

In some embodiments, illumination device 17 may transmit one frequency or set of frequencies of light while the projection device 13 or 18 may transmit a different frequency or set of frequencies of light 14 where these two frequencies or sets of frequencies are designed to interact to cause area 15 of object 16 to fluoresce to the human eye or on a display reproducing the image captured by camera 12. Note also that illumination of an area or object can include projecting pictures, shapes, diagrams, text, video or other visual information, as well as providing general illumination of the area.

In another exemplary implementation mobile phone 11 may be configured with an internal inertia recognition system to determine if mobile phone 11 is being moved and to assist in further keeping camera 12, projection device 13 or 18, and/or illumination device 17 focused on or oriented towards the same area or point in space despite the movement of mobile phone 11. This can be accomplished by utilizing data from an inertia recognition system configured on mobile phone 11 to adjust the position, orientation, and/or direction of camera 12, projection device 13 or 18, and/or illumination device 17. One skilled in the art will also recognize that data from an inertia recognition system can be used to adapt the image captured by mobile phone 11 for presentation on a display of, for example, mobile phone 11 or a remote assistance system. Such adaptation may be performed locally on mobile phone 11 or alternatively data from an inertia recognition system may be transmitted to a remote assistance client or a server where the data can then be used to adjust the image presented on a display.

In another embodiment mobile phone 11 may include location determination technology such as those offered by ultra-wideband networks, a global positioning system (GPS), or other similar location technology to determine the location of mobile phone 11 in the x, y, and z axis and to allow camera 12, projection device 13 or 18, and/or illumination device 17 to attempt to remain focused on the intended areas when mobile phone 11 is moved or relocated.

Note that in some embodiments, mobile phone 11 and/or camera 12 may include an image stabilization mechanism or image stabilization software that enables mobile phone 11 and/or camera 12 to stabilize a captured image when capturing, transmitting, and/or displaying the image. Image stabilization can be performed using image recognition, an inertia sensor or inertia recognition system built into mobile phone 11, or other similar methods known to those skilled in the art. Image stabilization techniques are further described herein.

Requests for remote assistance may be generated and transmitted using any means. In one embodiment, a user may press button 19 which may activate software within mobile phone 11 that generates and transmits a request to a remote assistance system. Button 19 may be a hardware control, a software control, or a combination thereof. Other means of requesting assistance using mobile phone 11 may be used, including calling a remote assistance system using voice communications features configured on mobile phone 11. Similar means may also be used to initiate, temporarily place on hold, terminate or otherwise control a remote assistance session or communications with a remote assistance center.

Figure 2:
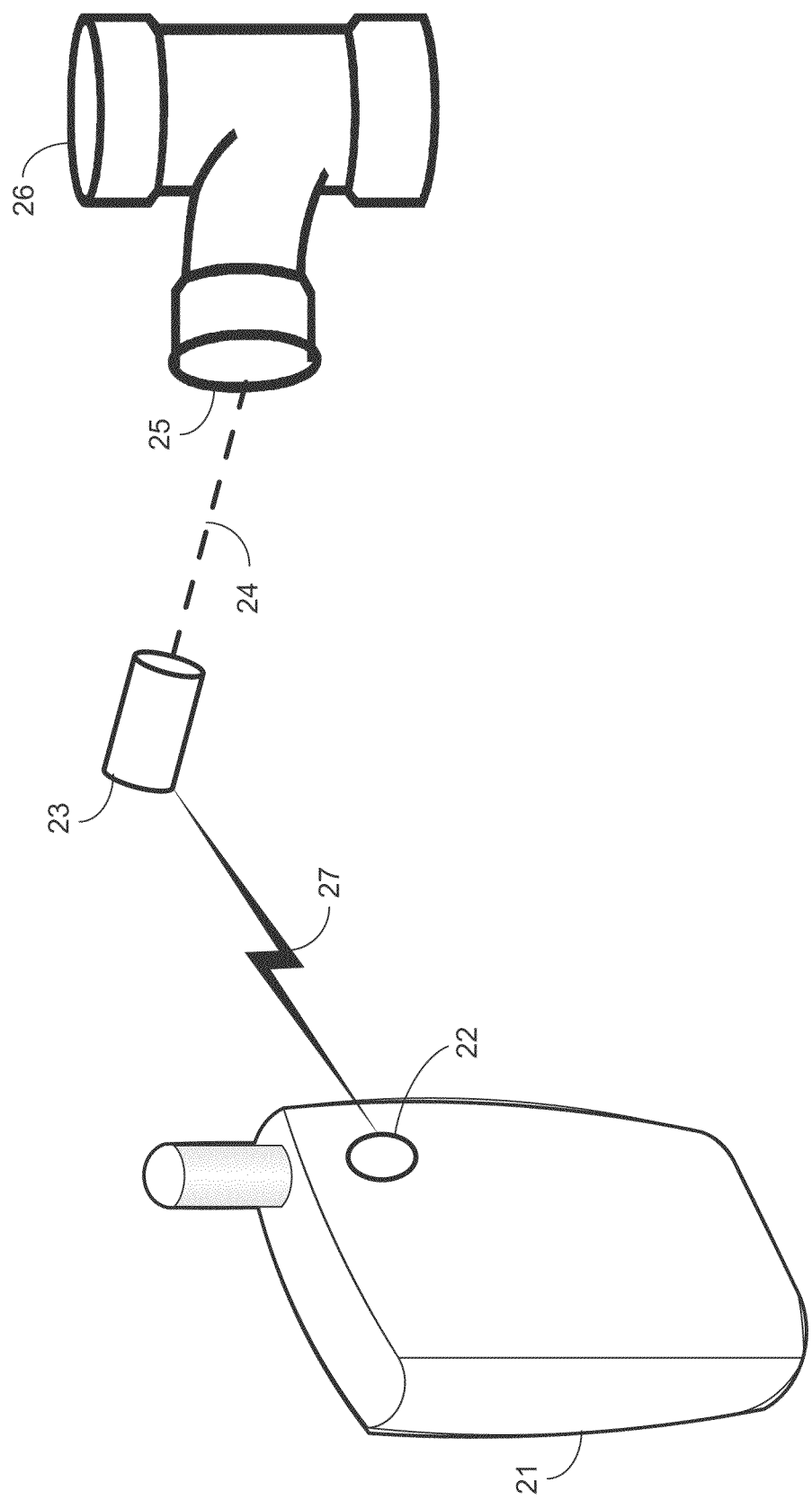
FIG. 2 illustrates another non-limiting exemplary mobile phone and associated devices in an environment in which remote assistance may be performed.

Referring now to FIG. 2, in another exemplary embodiment, mobile phone 21 may be configured to communicate with projection device 23, which may be physically separate from mobile phone 21 and configured to project light 24 onto area 25 of object 26. This allows projection device 23 to be operated as a separate unit, and allows illumination of or projection onto area 25 of object 26 from a different perspective and orientation than that of camera 22 on mobile device 21. In some embodiments, projection device 23 may be attachable to mobile phone 21, and may be operated both while attached to mobile phone 21 and while detached from mobile phone 21.

In embodiments where mobile phone 21 and projection device 23 may operate and communicate while physically separated, communication between the two devices may occur via wireless communications link 27, which may employ such technologies at such as Bluetooth™, WiFi, ultrawideband, white space, or other similar communications technologies in order to allow mobile phone 21, in some embodiments under the direction of communications received over a wireless data network, to control the focus, orientation, direction, and/or any other function of projection device 23. This allows the user of mobile phone 21 or a remotely connected user (described in more detail herein) to control and/or manipulate projection device 23. Communications link 27 may also be established over a public network such as a public cellular network or similar networks. One skilled in the art will recognize that projection device 23 can be incorporated with another device such as a Bluetooth™ headset, PDA, wirelessly connected camera, or other similar device without deviating from the intent of this specification. Note also that any device described herein may be physically separable from mobile phone 21 and may communicate with mobile phone 21 using any means as described herein in regard to projection device 23. All such embodiments are contemplated as within the scope of the present disclosure.

Figure 3:
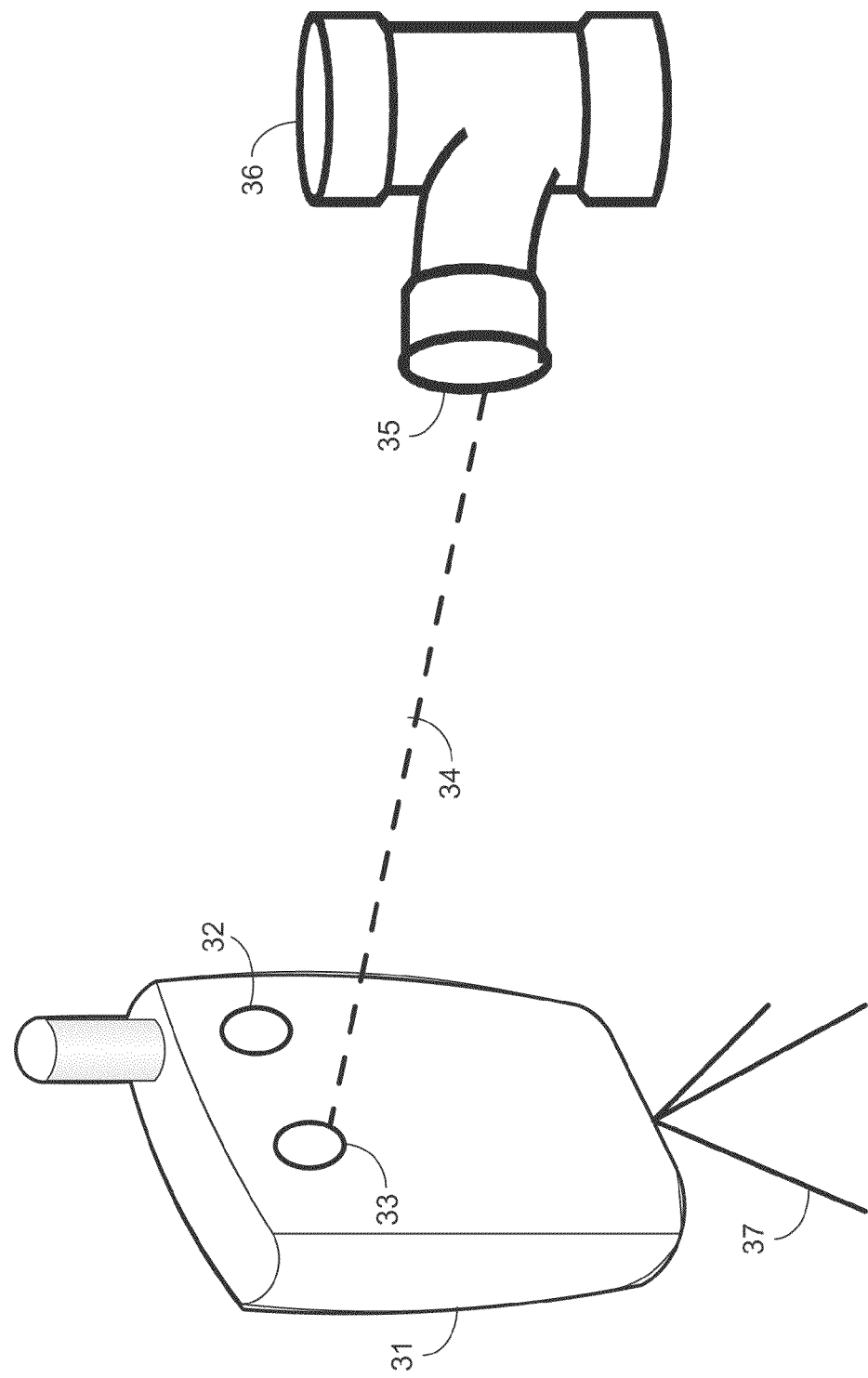
FIG. 3 illustrates another non-limiting exemplary mobile phone and associated devices in an environment in which remote assistance may be performed.

Referring now to FIG. 3, in another exemplary embodiment, mobile phone 31 configured with projection device 33 may be mounted on stabilization device 37. Stabilization device 37 may be any stabilization device, such as a tripod. Mobile phone 31 shown may contain a socket (not shown) or other element configured to receive stabilization device 37 in order for stabilization device 37 to be easily attached and detached from mobile phone 31. Stabilization device 37 may in some embodiments include a charging mechanism that may provide power to a battery or other element of mobile phone 31 that may be operated while mobile phone 31 is being operated to provide remote assistance.

In yet another exemplary embodiment, the stabilization device 37 can be configured such that camera 32 and/or projection device 33 is tilted in a downward direction to allow the camera 32 and/or projection device 33 to capture images and/or project light/images onto a flat surface, such as a table top. This would enable a user of mobile phone 31 to use both hands without having to manually orient and hold mobile phone 31 when utilizing remote assistance. For example, if remote assistance was being used to assist/monitor blood glucose levels, mobile phone 31 may be mounted on stabilization device 37 and oriented toward a table top. The user of mobile phone 31 could then use both hands and a standard blood glucose tester to draw blood and take a blood glucose reading. The remote assistance provider could offer help during the process and also capture the blood glucose reading on a system of the remote assistance provider as a picture.

In still another exemplary embodiment, mobile phone 31 may be configured to be placed on or removed from stabilization device 37 without interfering with any communications session that may be ongoing between mobile phone 31 and a remote assistance system. This would allow for a remote assistance session to be continued when a user of mobile phone 31 removes mobile phone 31 from or places mobile phone 31 onto stabilization device 37. In still another exemplary embodiment, stabilization device 37 is integrated into the case of mobile phone 31 in order to allow a user to have the mount conveniently available for their use as part of a remote assistance system.

Figure 4:
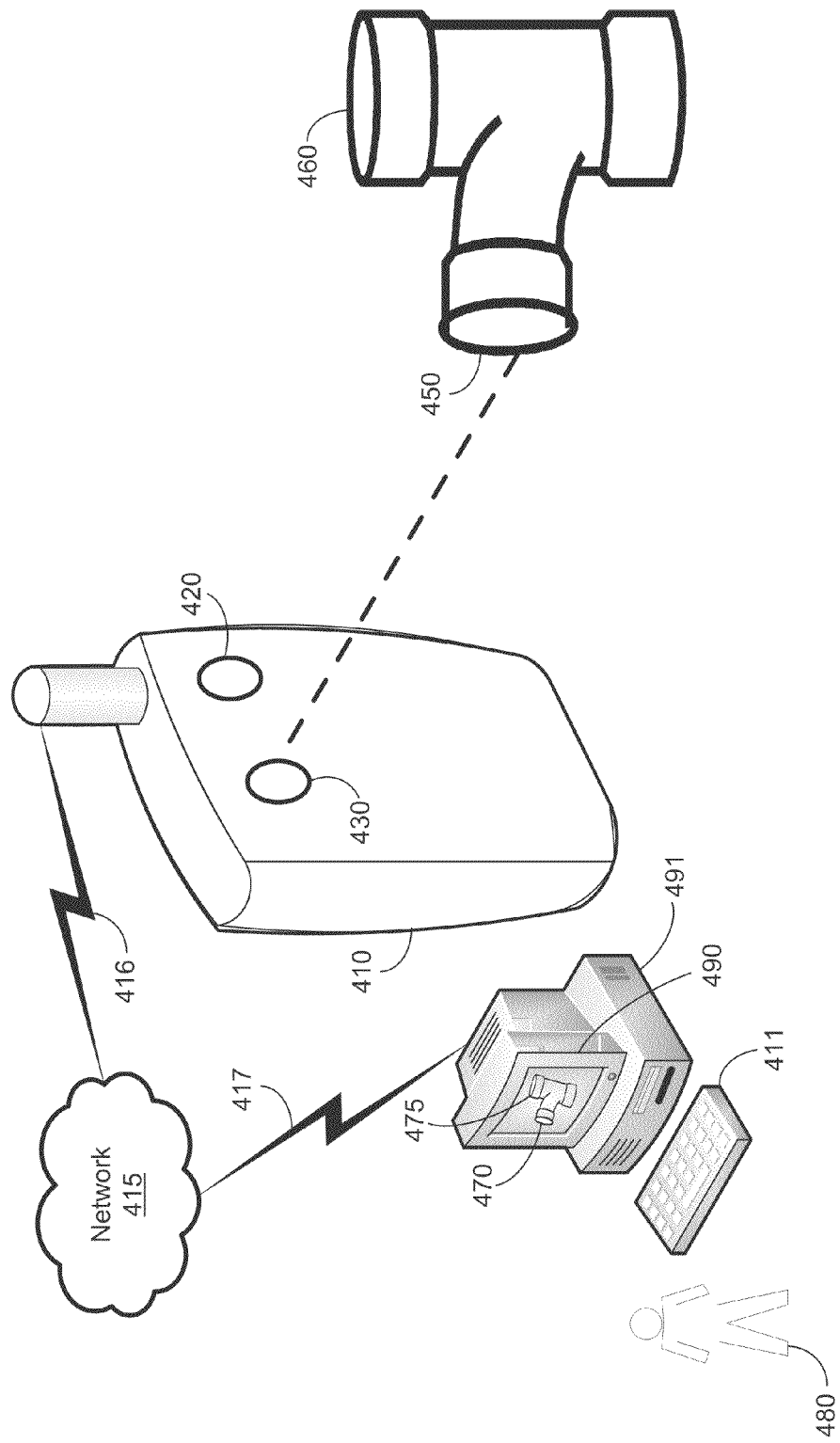
FIG. 4 illustrates a non-limiting exemplary mobile phone and associated devices and a remote assistance system in an environment in which remote assistance may be performed.

Referring now to FIG. 4, in another exemplary embodiment projection device 430 and/or camera 420 configured on mobile phone 410 may be controlled by remote user 480 to enable remote assistance to the user of mobile phone 410. Remote user's 480 input may be collected on remote computer 491, transmitted via communications link 417 to network 415, which may then transmit remote user's 480 input via communications link 416 to mobile phone 410. Remote computer 491 may be any electronic or computing device designed to implement any aspect the methods, apparatuses, and/or systems described herein. Network 415 may be any one or more communications networks of any type, including wired and wireless, using any data communications protocols and/or means that allow two or more devices to communication with one another. Communications links 416 and 417 represent any communications connection that allows two or more devices to communication with one another, including any wired and wireless communications means.

Remote user 480 may also view, manipulate, store, or otherwise access data, such as images, sound recordings, user-provided data, etc., received from mobile phone 410 via network 415 and communications links 416 and 417. For example, remote user 480 may view, on display 490 of remote computer 491, image 475 of object 460 captured by camera 420, which may include image 470 of area 450. Remote user 480 may also use controls 411 to cause remote computer 491 to transmit instructions to mobile phone 410 instructing it to manipulate the camera 420, projection device 430, and/or any other component or device communicatively connected to mobile phone 410. For example, remote user 480 may use controls 411 to cause remote computer 491 to transmit instructions that cause camera 420 to focus, cause light projected by an associated illumination device to be activated or adjusted, pan the image, change contrast, change hue, change amount of data transmitted, change the camera frame/capture rate, or other controls associated with a camera or illumination device. Controls 411 may also be used to activate or initiate a remote assistance session, manipulate a session, and/or terminate a session. Controls 411 that may be used to manipulate such components, devices, and sessions may include a touch screen, a mouse, an inertia sensor, a visual movement recognition device, and/or any other input device, and any number or combination thereof. Controls 411 may alternatively be a hardware device, such as a keyboard, tablet, or joystick, or alternatively may be soft keys or buttons on the display 490 of the remote assistance system 491.

Note also that remote user 480 may also user controls 411 communicate with a user of mobile phone 410 via voice communications transmitted to mobile phone 410 via an earpiece speaker, a Bluetooth™ or similarly connected headset, a speakerphone, a microphone/speaker, and/or any other device, and any number or combination thereof. Controls 411 and voice capabilities may allow remote user 480 to offer detailed assistance to a user of mobile phone 410. Controls 411 may also permit remote user 480 to use projection device 430 to projects images, indicators, light, etc. in order to highlight problem areas or point out what is being discussed without requiring remote user 480 to be in the same location as mobile phone 410.

Figure 5:
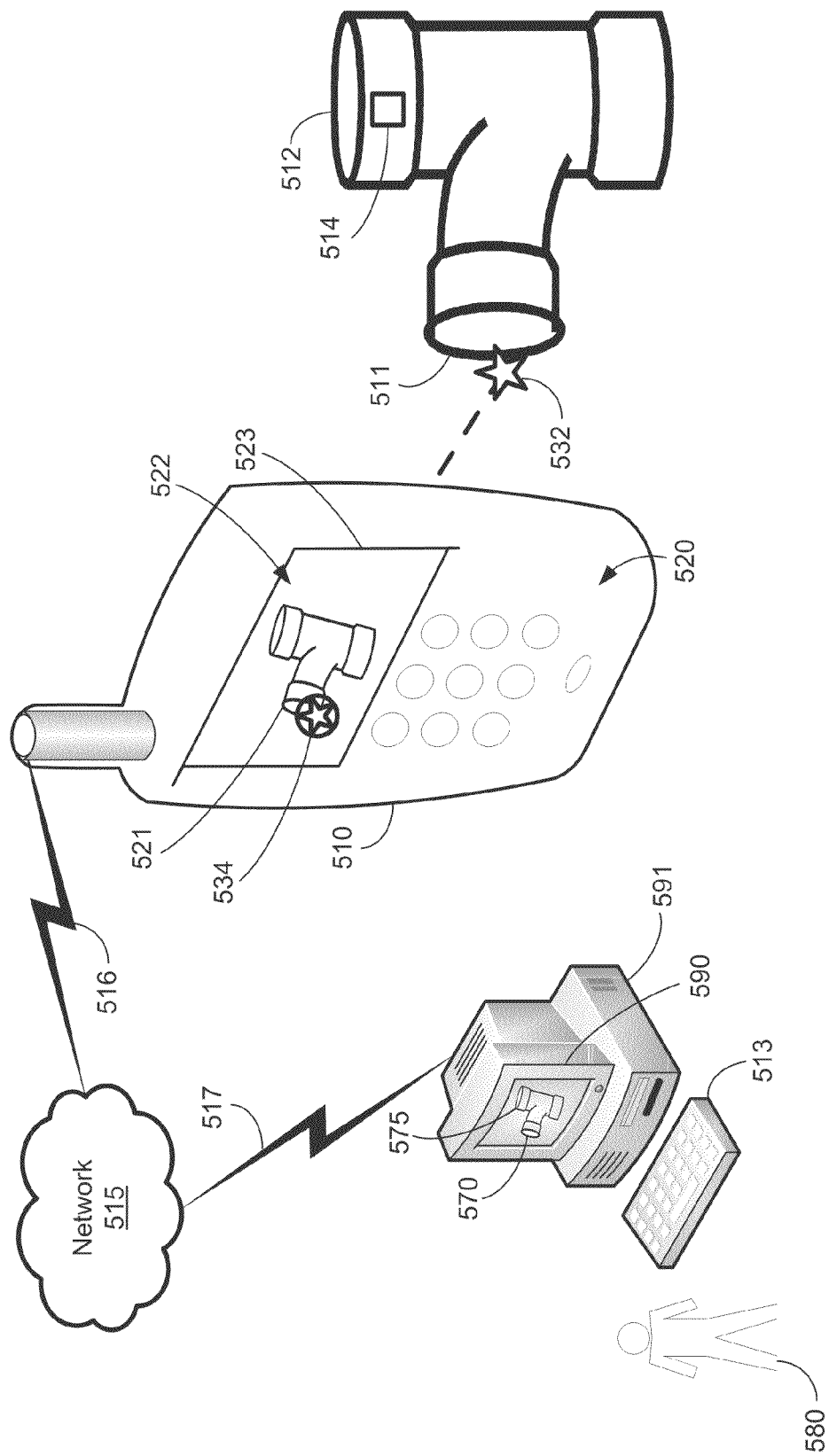
FIG. 5 illustrates another non-limiting exemplary mobile phone and associated devices and a remote assistance system in an environment in which remote assistance may be performed.

FIG. 5 illustrates another alternative embodiment of the present disclosure wherein mobile phone 510 is configured to communicate with remote computer 591 via communication links 516 and 517 and network 515 using any communications means described herein. In this embodiment, a user of mobile phone 510 may be able to access, view, and/or manipulate images using mobile device 510 and controls 520 configured on mobile phone 510. Controls 520 may include controls similar to controls 513 configured on remote computer 591 operated by remote user 580. Controls 520 and controls 513 may be hardware controls, software controls, or a combination thereof. Such controls may be used to request, initiate, accept, activate, manipulate, and/or terminate remote assistance sessions.

Mobile phone 510 may also be configured to present image 522 on display 523. Image 522 may be an image of object 512, and may include image 521 of area 511. Image 522 may be the same image as image 575 of object 512 and image 570 of area 511 presented to remote user 580 on display 590 of remote computer 591. This may allow remote user 580 and a user of mobile phone 510 to coordinate their activities during a remote assistance session by ensuring that both users are viewing equivalent images. Alternatively, image 522 may differ from image 575. For example, image 522 may be formatted differently based, at least in part, on the features and capabilities of mobile phone 510, communications channel 516 from mobile phone 510, network 515, communications channel 517 to remote assistance system 591, load on communications channels 516 and/or 517, load on network 515, processing capabilities of a network server assisting with remote assistance, load on network 515, load on a network server assisting with remote assistance, the processing capabilities of remote assistance system 591, any combination of these factors, or other processor and/or network loading or processing capabilities.

In some embodiments, a projection device of mobile phone 510 may project a particular indicator, shape, frequency of light, image, etc., such as star 532, onto an area or object, such as area 511, that may then be detected by software configured in mobile phone 510 or remote computer 591. In response to such detection, the software may create highlighted star 534, a highlighted or emphasized area 511, or take other actions based on the location and/or type of indicator projected when presenting images 522 and 575 during a remote assistance session.

In some embodiments, the visual data may be transmitted from remote assistance system 591 to the software in mobile phone 510 without requiring the use of a projection device. Further the visual data presented on display 523 may be presented in layers. For example, image 522 may be an image captured by a camera of mobile phone 510, and the image of highlighted star 534 may be overlaid upon image 522. Such layers may be generated by remote computer 591 operated by remote user 580. For example, user 580 may enter graphical information, such as instructions or commands to generate highlighted star 534, into remote computer 591, which may then transmit instructions to mobile phone 510 to present highlighted star 534 on display 523. Multiple graphical items or other visual data may be included in a single layer, and multiple layers may be created and presented to a user. Alternatively, a layer may be associated with a specific function or attribute, for example, a layer may be provided for text and/or shape instructions to be presented upon an image, while another layer may be provided for overlaying images indicating safety hazards. User 580, using remote computer 591, may control the presentation, hiding, or manipulation of such layers. Alternatively, or in addition, the user of mobile phone 510 may control the presentation, hiding, or manipulation of these layers.

In some embodiments, layers may be locked to, aligned with, or otherwise associated with specific visual data in image 522 or items within the image capture area of the camera of mobile phone 510. This will allow the layers to be consistently located in a specific area relative to the items in the image capture area. For example, highlighted star 534 may be created in a layer and initially located at image 521 of area 511. By recognizing area 511 in future captured images, highlighted star 534 may be correctly placed at images of area 511 within images captured in the future, regardless of whether such images are located in the same space on the display presenting such images. This alignment and area item recognition may be accomplished using image recognition, an inertia sensor/recognition system built into mobile phone 510, or other similar means known to those skilled in the art. Note that the process of creating and aligning may be performed on mobile phone 510, remote computer 591, a network device, some other remote device, or a combination thereof. Further the image recognition system may alternatively use images not previously transmitted by mobile phone 510. These images can be stored locally on the system providing remote assistance or on a data network. These stored images can be used to assist in positioning, indexing, or sizing the layers to the image being displayed on mobile phone 510 and/or remote assistance system 591.

In one embodiment, the image displayed on mobile phone 510 is generated locally in mobile phone 510 using the image captured by mobile phone 510 and the layer information being transmitted by remote assistance system 591 or a network server. Alternatively the image displayed by mobile phone 510 can be generated by remote assistance system 591 or a network server and transmitted via a data network 515.

In one embodiment, the user of mobile phone 510 may perform a manual form of image stabilization or image indexing. Such stabilization and/or indexing may or may not be accompanied by an automated form of image stabilization and/or image indexing that may be performed by mobile phone 510, remote computer 591, a network server, and/or some other device. To perform the manual image stabilization or image indexing a graphical indicator such as highlighted star 534 may be superimposed, in one embodiment using the layering method described above, on the image 522 being presented on display 523. Such a graphical indicator may be placed in a layer or otherwise added to image 522 by mobile phone 510 or by remote computer 591. The graphical indicator may initially be aligned or associated with a particular point in image 522, such as image 521 of area 511. The user of mobile phone 510 would be instructed to keep the graphical indicator, for example highlighted star 534, aligned with area 511 as presented in image 522 by moving mobile phone 510 appropriately. This would allow the user of mobile phone 510 to perform or assist in performing image stabilization or image indexing. It would also allow mobile phone 510 to be realigned in the event that mobile phone 510 was moved from its original position.

In a further aspect of the present disclosure, an indexing device, such as indexing device 514, may be affixed to a point in the environment. Indexing device 514 may be a shape, color, size, or have other attributes that are recognized by software and/or hardware configured on mobile phone 510, remote computer 591, or both. Alternatively indexing device 514 may contain a marker that could readily be identified in an image captured by a camera of the mobile phone 510 by software and/or hardware configured on mobile phone 510, remote computer 591, or both. Such a marker may or may not be visible or detectable by the human eye. Indexing device 514 may be used to assist the system in indexing image 522 to other graphical layers and/or to provide image stabilization for mobile phone 510 and/or remote computer 591. In some embodiments, multiple indexing devices may be placed in the environment and detected. In one implementation, each of these indexing devices may have a unique signature or attribute to assist in the orientation of image 522 and/or additional visual data that may be superimposed on image 522. Indexing devices can be as simple as a reflective device or more complex, such as infrared LEDs that can be recognized by a properly configured camera on mobile phone 510. Multiple indexing devices, whether containing a unique identifier or similar identifiers, may be used to orient the image in a three-dimensional manner. Software on mobile phone 510 or remote computer 591 can be programmed to recognize the spatial differences of the indexing devices to assist in determining the approximate location of the camera on mobile phone 510 and/or the movement of mobile phone 510.

Figure 6:
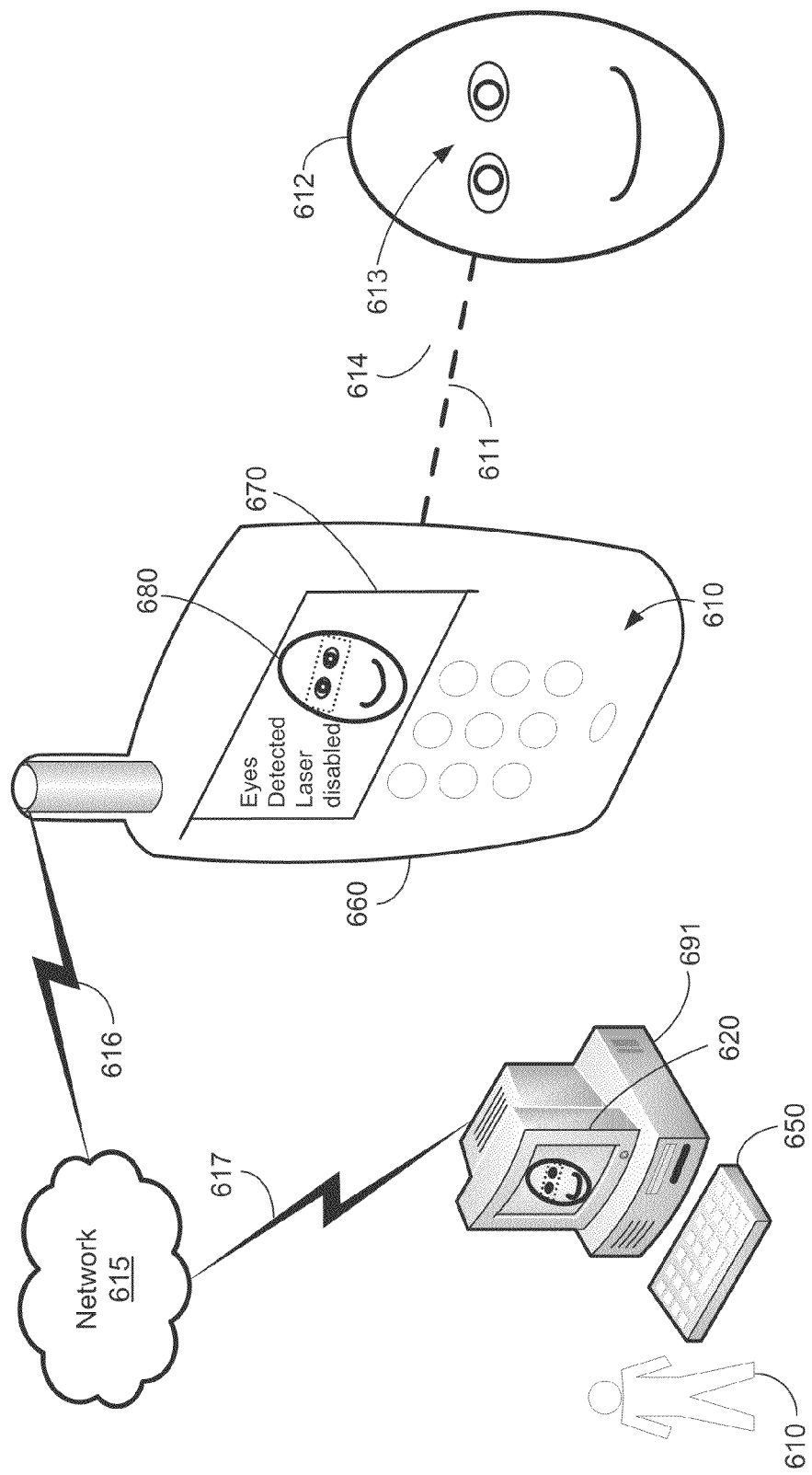
FIG. 6 illustrates another non-limiting exemplary mobile phone and associated devices and a remote assistance system in an environment in which remote assistance may be performed.

Referring now to FIG. 6, which illustrates another alternative embodiment of the present disclosure wherein mobile phone 660 is configured to communicate with remote computer 691 via communication links 616 and 617 and network 615 using any communications means described herein. In some embodiments, software may be used to enable recognition by mobile phone 660 of eyes 613 on face 612 and to automatically turn off, modify the intensity of, or otherwise change the controls of a projection device configured on mobile phone 660 to prevent the projection of light or images 611 into eyes 613. This allows mobile phone 660 to be used in a safe manner when mobile phone 660 is configured with a projection device that generates a laser beam or strong light source that may be harmful when directed toward eyes.

In another embodiment, display 620 of remote computer 691 may be configured to provide a different image or view of an image from image 680 presented by display 670 of mobile phone 660. Each image prepared for presentation on such displays may be adjusted to suit the type of display and related equipment used. Such adjustments may include items such as screen size, focus, tool bars presented, or similar controls and characteristics. These adjustments can be automatically implemented or performed under the direction of a user, for example through the manipulation of controls 610 or 650, or a combination thereof.

In another embodiment, remote computer 691 may be configured with software and/or hardware that allows remote computer 691 to detect a type, model, or other characteristics of mobile phone 660, such as determining the size and/or resolution of display 670 of mobile phone 660 and adjusting the images transmitted to mobile phone 660 to optimize or modify the image to fit screen 670. Optimizations and adjustments may include adjusting image size, aspect ratio, image quality, available data link throughput, sound quality, size and placement of the user controls, type of user controls presented, power use, or other means to adapt the remote assistance session to better accommodate the mobile phone, network, communications means, or other elements used during a remote assistance session.

In still another embodiment, mobile phone 660 may be configured to send remote computer 691 an indication of the maximum area that can be covered by a camera configured on mobile phone 660. Current statuses and characteristics of mobile phone 660 may also be transmitted to remote computer 691 by mobile phone 660, such as current status of a camera, illumination device, projection device, battery, or any other device or component, characteristic of devices such as wide or tight focus on a camera, focus point of a camera, minimum focus length of a camera, light intensity of an illumination device, etc. These characteristics may be presented to user 610 of remote computer 691 and/or utilized by the remote computer decision making process when providing remote assistance; e.g., the remote computer may recognize a low battery condition on mobile phone 660 and will automatically dim the projection device on mobile phone 660 while providing a visual/audible indication to user 610 of remote computer 691.

Figure 7:
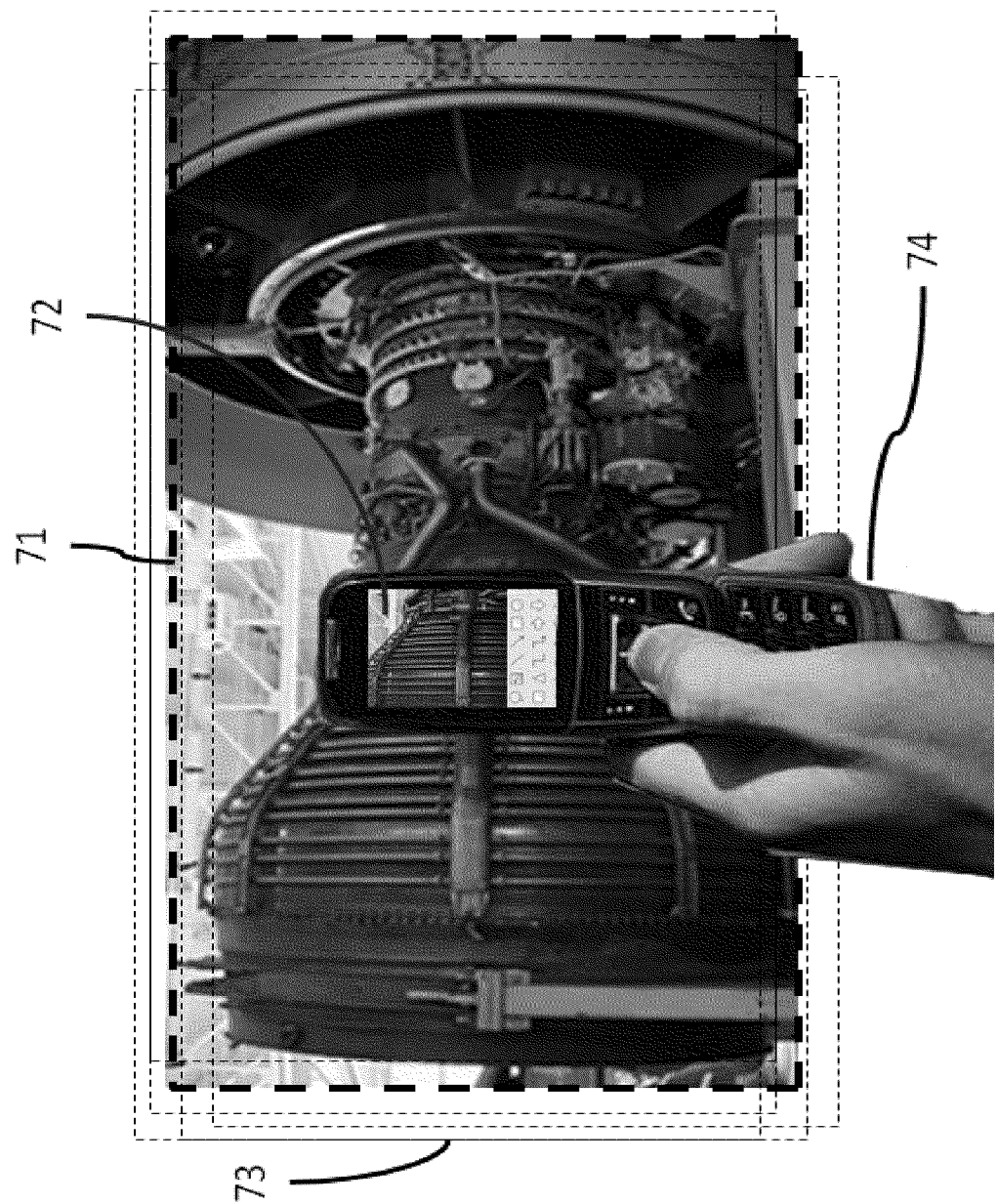
FIG. 7 illustrates a non-limiting exemplary mobile phone and images that may be captured thereby.

In some embodiments, a mobile phone, a camera, and/or a remote computer operating with a mobile phone in a remote assistance system may be configured with an image stabilization mechanism or software to enable the mobile phone, a camera, and/or a remote computer to stabilize the image when capturing, transmitting, receiving, retransmitting, and/or displaying the image. FIG. 7 illustrates such an example of such an embodiment. A user of mobile phone 74 may desires to transmit image 72 to a system providing remote assistance. A camera configured on mobile phone 74 may be programmed to capture image 71 consisting of at least a portion of the total image capture area of the camera configured on mobile phone 74. In such an embodiment, the total captured image 71 may encompass a larger area than the area included in transmitted image 72. This allows software in mobile phone 74 to automatically adjust and stabilize transmitted image 72 before transmitting image 72 in order to provide an image that appears to be stable while the actual viewing area 73 that may be captured by the camera of mobile phone 74 continues to change, as indicated by the dashed lines of FIG. 7. Image stabilization may be performed by a camera module of mobile phone 74 configured to capture a wider area view than is actually transmitted over to another device. In one embodiment, image recognition software or components may be used to provide a focal point or other data that may be used by image stabilization means.

In another embodiment, the image captured may also be stabilized for the local user operating mobile phone 74. This stabilization may be performed using the same means as described above in regard to stabilizing an image transmitted to a remote device.

A still further aspect of some embodiments allows a remote system to control transmitted image 72. For example, a remote system may focus image 72, widen the view captured in image 72, scroll the portion of image 72 being transmitted, or other similar image manipulation of the image being transmitted.

A further aspect of some embodiments allows the image presented by a display of mobile phone 74 to be different from image 72 transmitted to a remote system. This may allow a user of the remote system providing assistance to a user of mobile phone 74 to independently scroll the image received at the remote system without interfering with the view presented on a display of mobile phone 74.

A further aspect of some embodiments allows an image presented on a display of mobile phone 74 to not rely on image stabilization, or to alternatively rely on a different image stabilization means than the image stabilization means used on a remote device. Since a user of mobile phone 74 may be in control of the positioning and movement of mobile phone 74, the user of mobile phone 74 may be more accustomed to the natural movement of the image on mobile phone 74 and may more readily accept the natural movements without image stabilization or with a different type of image stabilization. The image stabilization used for the display of mobile phone 74 can alternatively be optimized for use on a mobile phone similar to mobile phone 74 and therefore may use the resources of the mobile phone more efficiently.

Additionally, in some embodiments a visual indication of the view being presented on a remote device and mobile phone may be presented on a display of the alternative device. For example, software in mobile phone 74 may be configured to allow the display of mobile phone 74 to present a dashed outlined box, a marching ants effect, a shaded box, a semi-transparent area, or other similar effects.

Furthermore, some embodiments may allow either the user of mobile phone 74 and/or the user of a remote system in communication with mobile phone 74 to readjust the user's current view to match the other user's view. For example, if remote user party is providing remote assistance and has invoked the feature enabling the remote user to view a separate area form that viewed by the user of mobile phone 74, remote assistance software may be programmed to present a control on the remote assistance system indicating "Phone View", "Sync Views", "Align Views", or similar wording. This control, when selected, would set the view presented to the remote user of the remote system to align at least partially with the view presented on mobile phone 74. This same functionally can be provided for use by the user of mobile phone 74 by software configured on mobile phone 74.

Figure 8:
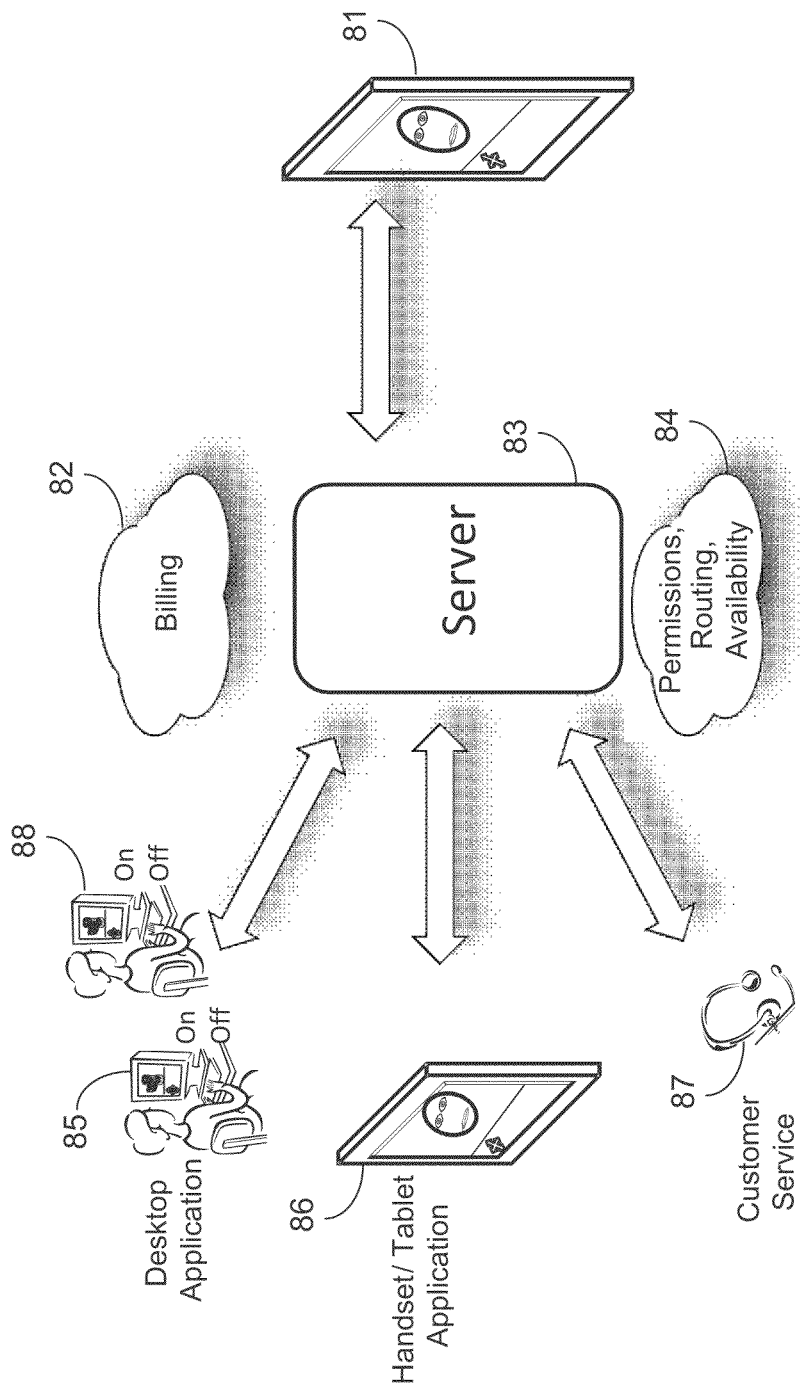
FIG. 8 illustrates a non-limiting exemplary remote assistance system.

FIG. 8 illustrates a non-limiting, exemplary ecosystem for remote assistance. The ecosystem shows server 83 involved in the transaction between devices 86, 85, and 88 that may be providing remote assistance and mobile phone 81 receiving such assistance. One skilled in the art will recognize that a remote assistance transaction or session can be performed directly between one or more of devices 86, 85, and 88 providing remote assistance and mobile phone 81 receiving remote assistance via an interconnecting network or directly between devices 86, 85, and 88 and mobile phone 81. In some embodiments, server 83 may primarily track the status of remote assistance transactions or sessions. In such embodiments, mobile phone 81 and/or one or more of devices 86, 85, and 88 may conduct a remote assistance transaction or session while reporting the status of the remote assistance session to server 83, or via routing the remote assistance session through server 83. When routing a remote assistance session through server 83 or informing server 83 of the status of the remote assistance service, it is possible to provide a centralized billing capability, customer service, permission based handling of the remote assistance request, authentication, or other similar services from server 83. Routing a remote assistance session or the status of a remote assistance session through server 83 may be preferable in offering a commercial or business to business service as such services often demand functions such as the ones listed above.

In some embodiments, when routing a remote assistance session through server 83 or informing server 83 of the status of the remote assistance service, it is possible to allow multiple different devices 86, 85, and 88 to share in offering remote assistance. Optionally multiple devices 86, 85, and 88 can offer remote assistance simultaneously or the remote assistance session can be passed off between multiple devices 86, 85, and 88 to provide different parts of the remote assistance session. Additionally any billing functions 82 of server 83 can be programmed to put together multiple records into a single event when handing off a remote assistance session between different devices 86, 85, and 88. Additionally server 83 can be programmed to track and bill 82 or their surrogate different components of the remote assistance session such as voice, video, utilization of different resources, etc.

Additionally, different devices 86, 85, and 88 may be provisioned to provide remote assistance at different billing rates. For example assistance received from device 88, or the user thereof, may bill $X per increment, whereas device 85, or the user thereof, may bill $Y per increment, while device 86, or the user thereof, may bill $Z per increment. Billing rates may be dependent on the education and experience of the operator of a device or the person providing the assistance, or the variable costs of the equipment required to provide the requested assistance, or some other similar methods.

In some embodiments, revenue sharing between the devices 86, 85, and 88 and/or the operators thereof may be implementing for providing remote assistance. Server 83 may be programmed to track and pay through billing system 82 the operators of devices 86, 85, and 88 providing remote assistance. The payment to operators providing remote assistance may be on a per minute basis, other time-based fees, based on a share of the revenue, a flat rate per session, a flat rate per increment of time, included into the price of equipment/service purchased, or any other billing mechanism or manner of adequately compensating the parties.

In another aspect, the user of mobile phone 81 requesting remote assistance may bid for the services of the operators of devices 86, 85, and 88 in an auction type format. The auction format can be alternatively based on a first past the post format (first subscriber bidding more than a stated amount), buyout auction (with a set price (the 'buyout' price) that any bidder can accept at any time during the auction, thereby immediately ending the auction), Dutch auction (also known as an open descending price auction where the auctioneer begins with a high asking price which is lowered until some participant is willing to accept the auctioneer's price), English auction (also known as an open ascending price auction which is arguably the most common form of auction in use today where participants bid openly against one another, with each subsequent bid higher than the previous bid), auction with a reserve, Vickrey auction (also known as a sealed-bid second-price auction where the winning bidder pays the second highest bid rather than their own, which is very similar to the proxy bidding system used by eBay, where the winner pays the second highest bid plus a bidding increment), some combination of these auction types, or other types of auction.

In other embodiments, the user of mobile phone 81 requesting remote assistance is allowed or encouraged to provide feedback on the quality of the service provided by the operators of devices 86, 85, and 88 that provided remote assistance. The feedback can be a subjective measurement, an objective measurements (e.g., grade point average of a student being tutored via remote assistance, changes in grade point average of a student being tutored), or some combination of objective and subjective measurement. Raw feedback (e.g., comments), summary of feedback (e.g., feedback scores), summary of feedback by category (e.g., feedback score by different category) or some combination of the feedback may be gathered. Any type and quality of feedback can be stored on server 83 and presented to future parties requesting remote assistance. This feedback can assist a party requesting remote assistance in making the decision to use the services of any of the operators of devices 86, 85, and 88.

In some embodiments, the operators of devices 86, 85, and 88 providing remote assistance may bid to offer services to the user of mobile phone 81 requesting remote assistance. For example the user of mobile phone 81 may state a time limit for bidding and the operators of devices 86, 85, and 88 may then bid to offer the service. The bids can be evaluated on a lowest cost basis, lowest cost adjusted for ranking, for operator quality by allowing only the operators of devices 86, 85, and 88 ranking above a predetermined level to bid, or a similar bidding method or through the use of an auction type described earlier in this disclosure.

In a further aspect, operators of devices 86, 85, and 88 can offer a group or package of remote assistance. For example operators of devices 86, 85, and 88 may bid on a package of X number of art lessons, Y number of psychotherapy session, Z number of baseball coaching sessions, a semester of algebra homework assistance or other similar grouping of remote assistance. The server 83 would track and account for these groups or packages and would provide the requestor and the provider a status indicator as to the consumption, remaining balance, and other relevant information for the group or package of remote assistance.

In yet another embodiment, a third party may coordinate the provision of remote assistance to the user of mobile phone 81 requesting remote assistance. This coordination may be particularly helpful if multiple parties are required to provide remote assistance on a single session or on a single issue. The coordination can include adding remote assistance parties, removing parties from remote assistance, allowing the coordinator to determine if the parties can participate verbally, allowing the coordinator to determine if other parties can provide visual markups, allowing the coordinator to determine if other parties can manipulate a camera, projector, illumination device, or other devices configured on a mobile phone, allowing the coordinator to determine if another party's display capabilities are used in determining the type/throughput of data from the mobile phone, or similar types of control by the coordinator. In some embodiments, a coordinator may be an operator of devices 86, 85, and 88 and may be involved with providing remote assistance, or the coordinator function can be accomplished by mobile phone 81.

In some embodiments server 83 may record a remote assistance session between the user of mobile phone 81 requesting remote assistance and one or more operators of devices 86, 85, and 88 providing remote assistance for future playback. The recording can alternatively be restricted to only image data (e.g., images captured by mobile phone 81 and the images presented by the remote assistance computer 86, 85, and 88), one/two way audio information, or some combination of these.

In other embodiments, operators of devices 86, 85, and 88 providing remote assistance to the user of mobile phone 81 may log on or off of server 83. In such embodiments, server 83 may inform the user of mobile phone 81 of the availability of the alternative remote assistance provided by the party operators of devices 86, 85, and 88. The operators of devices 86, 85, and 88 providing remote assistance may maintain a calendar of planned availability on server 83 so the parties needing remote assistance, such as the user of mobile phone 81, can determine when the correct, desired, or required operators of devices 86, 85, and 88 might be reasonably expected to be available.

In another aspect of the present disclosure, server 83 may categorize the parties providing remote assistance in a manner to allow a party requesting remote assistance to readily choose from among the available remote assistants, such as the operators of devices 86, 85, and 88.

In some embodiments, remote assistance requests may be queued on server 83. This would allow the user of mobile phone 81 requesting remote assistance to be placed into a waiting line to be assisted by the operators of devices 86, 85, and 88 in turn. This queue can be a first come first served, priority by customer detail, priority by urgency, priority by status, priority by payment, or some combination of these factors. Any other method to appropriately prioritize the parties requesting remote assistance may be employed.

An additional aspect of the present disclosure is implementing the present remote assistance systems in conjunction with a customer service center. Server 83 can be programmed to interface with other network servers (not shown) to determine how to handle a remote assistance request. This can include assigning customer numbers, prescreening remote assistance requests and similar issues related to the routing, servicing, prioritizing, recording, or billing of remote assistance requests from customers of a business, charity, or entity.

In some embodiments, client-to-client direct remote assistance may be permitted. For example, each of the operators of devices 86, 85, and 88 may be a user of a remote assistance system, and may also provide assistance to each other and/or the user of mobile phone 81. In this implementation of remote assistance, the functions of the remote assistance application would be performed by client devices 81, 85, 88, and/or 86. This would enable the remote assistance service to be offered without requiring server 83.

Figure 9:
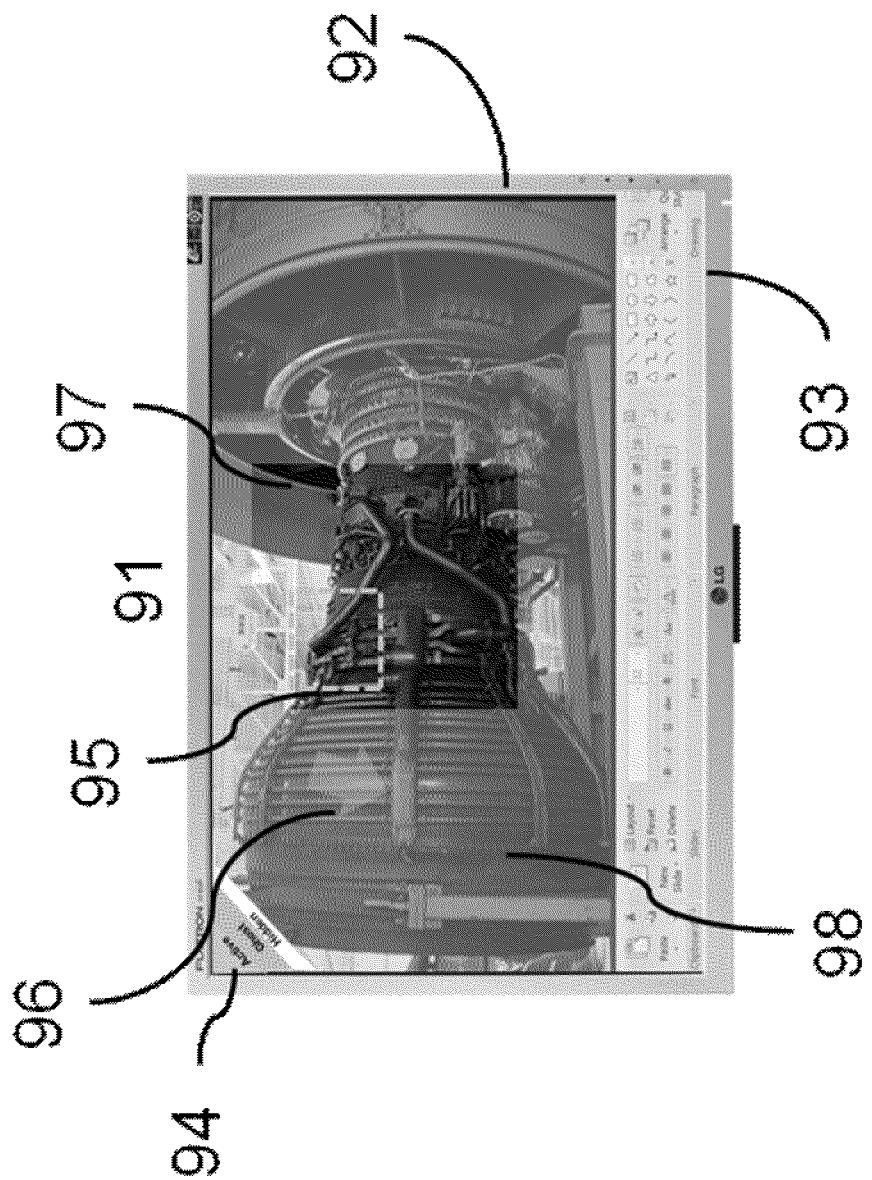
FIG. 9 illustrates a non-limiting exemplary interface to a remote assistance system.

Referring now to FIG. 9, which illustrates an overall view 97 containing all views presented to an user of remote assistance system 91, in some embodiments remote assistance system 91 may display real-time or near real-time pictures or video from a remote client, such as any mobile phone as described herein, in real-time view 95 of view 97. Remote assistance system 91 may also display historical view area 98 showing areas that have been previously viewed by a camera configured on a remote client. Historical view area 98 may not include images that are currently being, or have recently been, transmitted by a remote client to remote assistance system 91. The images of an area currently being transmitted by a remote client may or may not be the entire area captured by a camera on the remote client. The area of the image transmitted by a remote client can be optionally controlled by a server associated with a remote assistance system, such as server 83 of FIG. 8, or a remote device that is providing remote assistance.

Historical view area 98 may be highlighted in some manner on display 92 of remote assistance system 91 to allow a user of remote assistance system 91 to easily differentiate between real-time (i.e., an image currently being transmitted) view 95 and non real-time (i.e., image area previously transmitted) video or images displayed in historical view 98. Remote assistance system 91 software may include a tool on tool bar 93 for a user to control the shading of historical view area 98, the transparency of such shading, or similar shading controls. Historical view area 98 may be accumulated from previously transmitted data received from a mobile phone that captured the images that have been presented in real-time view 95. Remote assistance system 91 may display historical visual data in a different format from the real-time or near real-time visual data being displayed. This differentiation of the view between historical data and real-time or near real-time data allows a user of remote assistance system 91 to focus on the real-time visual data while still viewing the historical data sent from a client mobile phone. It is possible that historical view area 98 is allowed to age over time, for example, image 98 or portions of image 98 may get more muted according to the age of image 98.

Optionally the image presented on remote assistance system 91 may include space in historical view area 98 that has not yet been transmitted. The user of remote assistance system 92 may program the system to periodically capture a wide area image in order to update historical image 98. For example, the current view of mobile phone 95 and/or the remote assistance system may be less than the total potential capture area of the camera on the mobile phone, the remote assistance system may alternatively be programmed to expand the view of the camera on the mobile phone and transmit an image containing this view to update the historical view area 98. This wide area view of the camera may alternatively be disabled on mobile phone 95. The system can designate this area in some manner (e.g., hash marks or pixilation) or it might attempt to find an image on the web or in a database to fill in the spaces for which no image has yet been transmitted. For example, if a mechanic was receiving assistance for a 2000 Ford Explorer engine, remote assistance system 91 may fill the historical area with a suitable image.

In some embodiments, the user of remote assistance system 91 providing remote assistance may request a change in the view captured by a camera of a mobile phone operated by a user requesting remote assistance. One method to achieve this functionality is to allow the user of remote assistance system 91 to select a tool from tool bar 93 that allows the user of remote assistance system 91 to drag real-time view 95 to a new location. The user of remote assistance system 91 may also simply drag or resize real-time view 95, or a window containing real-time view 95, in order to change the view captured by the camera of a mobile phone operated by a user requesting remote assistance and therefore the image presented in real-time view 95. In such an embodiments, a prompt (not shown) may be generated on the mobile phone operated by the user requesting remote assistance that asks that user to move the mobile phone in the indicated direction. Alternatively, where components (e.g. camera, illumination device, projection device) of the mobile phone operated by a user requesting remote assistance are remotely controllable, instructions may be transmitted from remote assistance system 91 to the mobile phone instructing the mobile phone and/or one or more components of the mobile phone to make adjustments that will provide the view requested by the user of remote assistance system 91.

In a further aspect of the present disclosure, a user of the remote assistance system 91 may drag the edge of the real-time view 95 in order to expand, contract, change, focus or otherwise alter the view or any other characteristic of a camera, projection device, and/illumination device on a mobile phone operated by a user requesting remote assistance. An example of how this feature can be implemented is to provide the user of remote assistance system 91 with a visual indication of the maximum allowable viewing area (see, for example, FIG. 7) of the camera on the mobile phone operated by a user requesting remote assistance. This may be accomplished by placing a different color, shaded, or highlighted border on the display of the mobile phone. This maximum allowable viewing area of mobile phone's camera may be different from view 97 or real-time view 95. The user of remote assistance system 91 may drag real-time view 95 to a different location on view 97 in generate a request transmitted to the mobile phone that requests the camera of the mobile phone to automatically expand, contract, change, focus or otherwise alter functions and/or attributes of the camera of the mobile phone. In order to accomplish this function, the mobile phone may be programmed to transmit to remote assistance system 91 an indication of the maximum viewing area or the ratio of real-time view 95 to the maximum viewing area.

It is a further aspect of the present disclosure to enable remote assistance system 91 to mark up or otherwise add visual data to any portion of view 97, including real-time view 95 and historical view 98. For example, a user of remote assistance system 91 may add shape 96 to view 97, highlight portions of view 97, add words to view 97, insert video, or otherwise edit view 97 in any way that may be helpful to a user of a mobile phone operated by a user requesting remote assistance. Such additional visual data may be transmitted to the mobile phone operated by a user requesting remote assistance, and/or may be stored on remote assistance system 91. When transmitted to a mobile phone, this additional visual data may be presented on a display of the mobile phone. When the areas of view 97 outside of real-time view 95 are supplemented with additional visual data, this data may be presented to the user of the mobile phone when the view presented on the mobile phone includes an area containing such data. For example, if such data is placed into an area that is not currently in the image capture area of the mobile phone operated by a user requesting remote assistance, when the mobile phone is moved to capture images from that area, the additional visual data is then presented on a display of the mobile phone.

In another aspect, remote assistance system 91 may construct or generate multiple layers 94 that may be added to or laid over view 97 and any view contained therein. Layers 94 can be active (i.e., shared with the mobile phone operated by a user requesting remote assistance and/or other users/systems providing remote assistance systems), ghosted (i.e., grayed out or washed out images shared with the mobile phone operated by a user requesting remote assistance and/or other users/systems providing remote assistance systems), or hidden (i.e., not viewable by the mobile phone operated by a user requesting remote assistance and/or other users/systems providing remote assistance systems).

Note that in some embodiments, both the duplex audio and image information may be communicated between a mobile phone operated by a user requesting remote assistance and remote assistance system 91.

Figure 10:
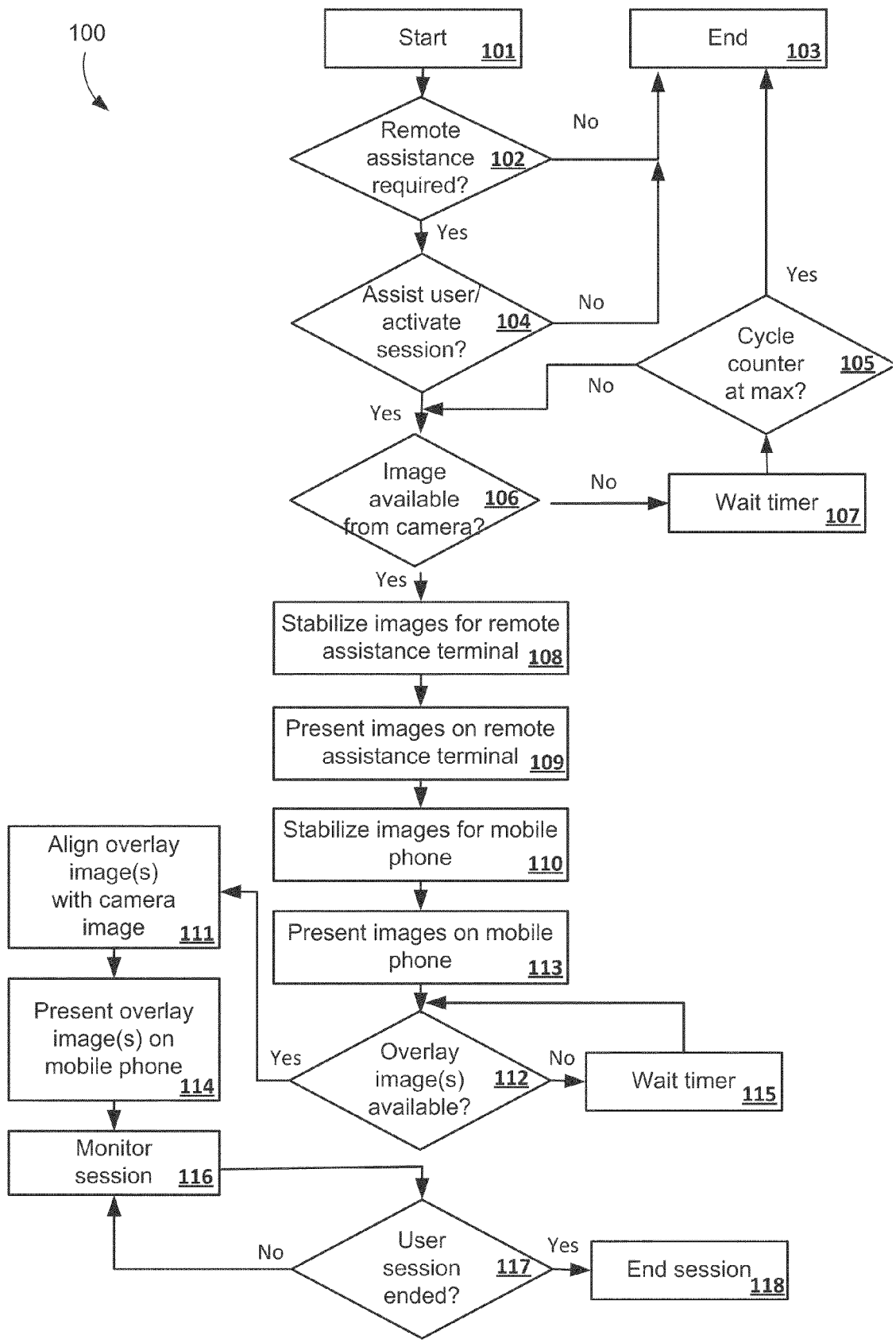
FIG. 10 illustrates a non-limiting exemplary method of implementing a remote assistance system.

FIG. 10 illustrates a non-limiting exemplary method 100 of implementing a remote assistance system as described herein. Starting at block 101, a decision is made at block 102 regarding whether remote assistance is required. This may be determined by evaluating a message, request, or any other form of communication that may be received from a user of a mobile device requesting remote assistance. If no remote assistance is required, the method terminates at block 103. If, at block, 102, it is determined that remote assistance is required, at block 104 a determination is made as to whether a remote assistance session should be activated and/or whether a user need assistance in activating a session. In one embodiment, a remote assistance system may track users eligible for remote assistance and check incoming requests for remote assistance against such data. For example, a remote assistance system may track subscribers, paid members, users with certain characteristics, account levels, credit levels, etc., and use such data in determining whether the user is eligible to use the remote assistance system. In other embodiments, at block 104, a remote assistance system may gather payment data, credit card data, user name and login, account data, etc. that may be used to determine whether a user may use the remote assistance system or to make a user eligible to use such a system. Also at block 104, a remote assistance system may query a user as to whether the user needs assistance with the process of setting up a remote assistance session, and may provide instructions in any form for assisting the user. Any assistance may be provided, any data may be requested and received from a user, and any criteria may be used to determine whether to proceed from block 104.

If a user is ineligible to use the remote assistance center, then the method terminates at block 103. If a user is determined eligible at block 104, at block 106 it is determined whether an image is available from a user's mobile device. If not, a remote assistance system may wait a predetermined time at block 107, checking at block 105 whether a limit to the amount of time a remote assistance system is to wait for an image has been reached. If such a limit is reached, the method may terminate at block 103. In some embodiments, at block 106, or at any other block, a request for an image may be transmitted to a user's mobile device, which may then capture and transmit an image in response. A remote assistance system may be configured to only wait for predetermined amounts of time for a response to such requests in the interest of not tying up system and network resources unnecessarily.

If an image is available, at block 108, the image may be stabilized for the remote assistance terminal using any means described herein, or any other image stabilization means. The stabilized image may then be presented on the remote assistance terminal at block 109. Similarly, at block 110 the image may be stabilized for the mobile device using any means described herein, or any other image stabilization means. The stabilized image may then be presented on the mobile device at block 113.

At block 112, a determination may be made as to whether overlay images are available. These may be images associated with one or more layers as described herein, or any other images that a remote assistance system may wish to overlay or otherwise combine with an image captured by a mobile device. If there are no such images to overlay, the method may move to block 115 where a timer may be used to determine when to check again for overlay images. Alternatively, the method may return to block 106 for further image capture and processing, or to any other block within method 100.

If overlay images are available, at block 111 such images may be aligned with the images captured by a mobile device of a user requesting help. This may include coordinating overlay images with indexing devices detectable in images captured by a user's mobile device, or any other means of assisting in locating overlay images properly on a captured image. At block 114, the overlay images may be to the user's mobile device for presentation. Note also that at block 114, overlay images may be presented to a remote assistance terminal. The overlay images transmitted to a user's mobile device and those used at a remote assistance terminal need not be the same overlay images, and such images may be manipulated in any way.

At block 116, the remote assistance session is monitored. At block 117, a session termination may be detected. This may be a result of a user or remote assistant manually terminating a remote assistance session, or the result of a loss of connectivity between a remote assistance system and a mobile device of a user, or for any other reason. If a termination or request for a termination is detected, at block 118 the remote assistance session is terminated.

Note that, at block 116, further remote assistance processing may be performed as well as monitoring for session termination. For example, the actions performed starting at block 106 may be continued indefinitely, until the session users are finished with the session. The blocks and corresponding actions presented in method 100 may be performed in any order, and no order of activity is to be construed from FIG. 10. The activities associated with the blocks set forth in FIG. 10 may be performed in conjunction with other activities not shown in FIG. 10. Moreover, one or more of the blocks in FIG. 10 and their associated activities may be performed in isolation or in conjunction with activities associated with other blocks in FIG. 10, without performing all of the activities associated with the blocks of FIG. 2. All such embodiments are contemplated as within the scope of the present disclosure. The activities performed in FIG. 10 may also be embodied in software or other computer-readable instructions that may be stored on any computer-readable medium, including storage disks, storage devices, memory, and any other device capable of storing such instructions.

It is to be understood that the embodiments and claims are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A method of providing remote assistance comprising:
receiving an image, captured by a mobile device, at a remote assistance device;
presenting the image on a display of the remote assistance device;
generating, at the remote assistance device, at least one layer of visual data and overlaying the at least one layer of visual data on the image captured by the mobile device; and
transmitting the at least one layer of overlaid visual data, to the mobile device.

2. The method of claim 1, wherein the overlay data comprises remote assistance data including at least one layer of visual data.

3. The method of claim 1, further comprising:
presenting the at least one layer of visual data as overlaid on the image presented on the display of the remote assistance device.

4. The method of claim 1, further comprising transmitting, to the mobile device, instructions to manipulate a component of the mobile device.

5. The method of claim 4, wherein the instructions comprise instructions to adjust at least one of a camera of the mobile device, a projection device of the mobile device, and an illumination device of the mobile device.

6. The method of claim 1, further comprising generating, at the remote assistance device, remote assistance session data and transmitting the remote assistance session data to a billing server.

7. The method of claim 1, further comprising coordinating remote assistance activities among a plurality of remote assistance providers.

8. A mobile device for use in a remote assistance system comprising:

an image capture device configured to capture images of a first area;

a projection device configured to project images onto a second area, wherein the first area and the second area substantially overlap, and wherein the mobile device is configured to output an overlapping portion of the first area and second area for display such that, as viewed by a user of the mobile device, the overlapping portion is visually overlaid on the captured images of the first area; and a transceiver configured to
- transmit image data associated with the captured images of the first area to a remote assistance system, and
- receive an instruction from the remote assistance system to adjust the image capture device, wherein the instruction is based at least in part on the image data transmitted to the remote assistance system, and wherein the mobile device is configured to adjust the image capture device responsive to the transceiver receiving the instruction.

9. The mobile device of claim 8, wherein the instruction comprises one or more instructions to adjust at least one of a focus, a zoom, an image capture area, an orientation, and a direction of the image capture device.

10. The mobile device of claim 8, further comprising a display device, wherein the transceiver is further configured to receive visual data from the remote assistance system, and wherein the mobile device is configured to display the visual data on the display device.

11. The mobile device of claim 10, wherein the visual data comprises at least one of text instructions, graphics, and an indicator.

12. The mobile device of claim 10, wherein the visual data comprises a graphical indicator associated with a physical object.

13. The mobile device of claim 8, wherein the transceiver is further configured to receive a projection instruction, and wherein the mobile device is configured to manipulate the projection device responsive to the transceiver receiving the projection instruction.

14. The mobile device of claim 13, wherein the projection instruction comprises visual data, and wherein the mobile device is further configured to manipulate the projection device to project the visual data onto the second area.

15. The mobile device of claim 14, wherein manipulating the projection device to project the visual data onto the second area comprises projecting a graphical indicator associated with an area of a physical object.

16. The mobile device of claim 14, wherein manipulating the projection device to project the visual data onto the second area comprises projecting the visual data onto a physical object.

17. The mobile device of claim 8, wherein the transceiver is further configured to transmit a request to activate a remote assistance session to a server of the remote assistance system and to receive remote assistance data from the server of the remote assistance system.

18. The mobile device of claim 8, further comprising an image stabilization means configured to generate stabilized image data, wherein the transceiver is further configured to transmit the stabilized image data to the remote assistance system.

19. The mobile device of claim 8, wherein the transceiver is further configured to transmit voice communications signals to the remote assistance system while receiving data communications signals from the remote assistance system.

20. The mobile device of claim 8, further comprising an illumination device.

21. The mobile device of claim 8, wherein the first area is associated with a physical object.

22. The mobile device of claim 21, wherein the second area is associated with an area of the physical object.

23. The mobile device of claim 8, wherein projecting the images onto the second area comprises projecting visual data onto a physical object.

24. The mobile device of claim 23, wherein the visual data comprises a graphical indicator.

25. The mobile device of claim 8, wherein the images of the first area comprise real-time images of the first area and the images projected onto the second area comprise historical images of the first area.

26. The mobile device of claim 8, wherein the images of the first area comprise historical images of the first area and the images projected onto the second area comprise real-time images of the first area.

* * * * *